UNITED STATES PATENT OFFICE.

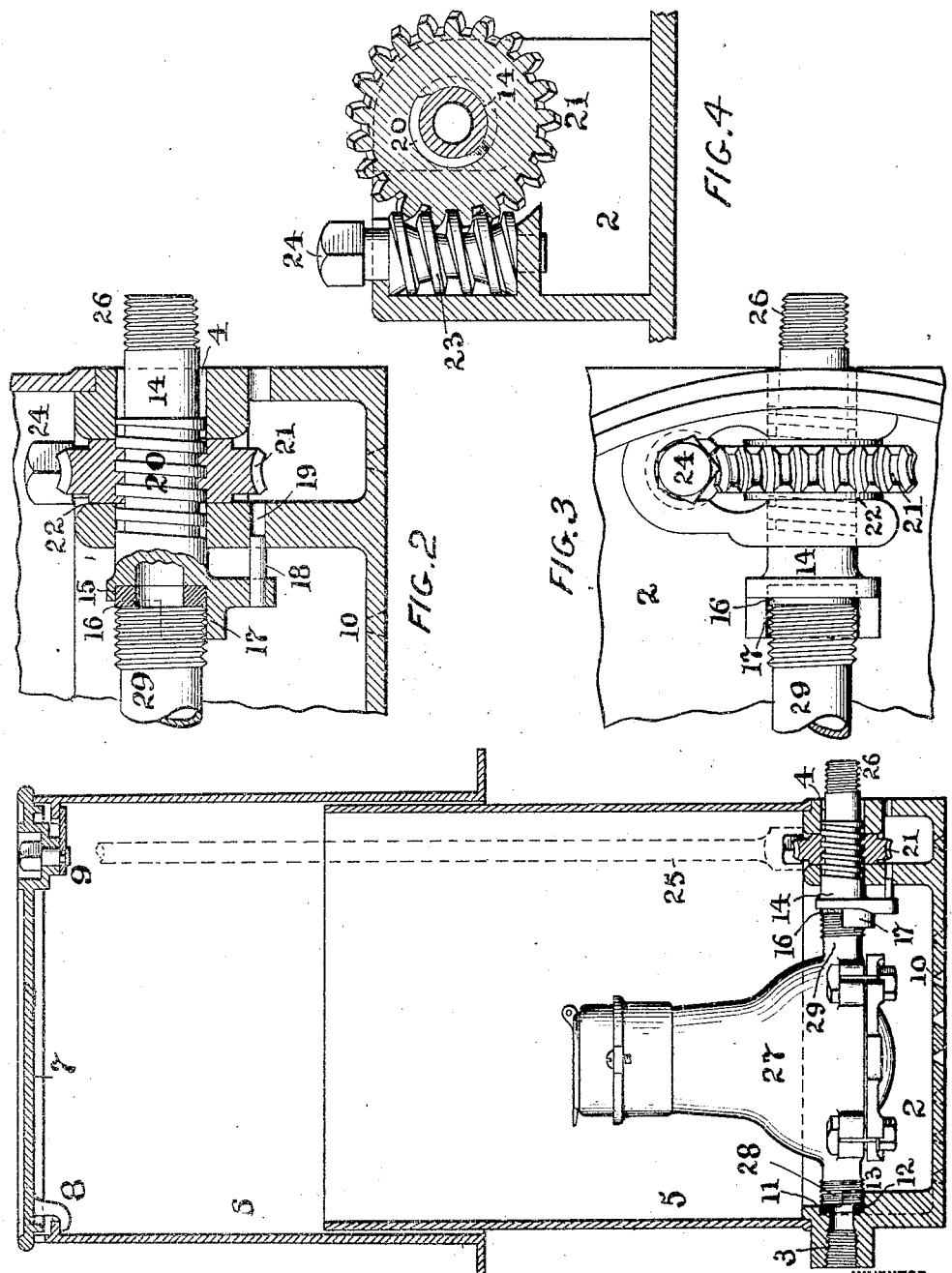

HERBERT M. LOFTON, OF CHATTANOOGA, TENNESSEE.

METER-BOX.

978,384.  Specification of Letters Patent.  Patented Dec. 13, 1910.

Application filed April 27, 1909. Serial No. 492,476.

*To all whom it may concern:*

Be it known that I, HERBERT M. LOFTON, a citizen of the United States, and a resident of the city of Chattanooga, county of Hamilton, and State of Tennessee, have invented an Improvement in Meter-Boxes, of which the following is a specification.

My invention has reference to improvements in street meter boxes and consists of certain improvements which are fully set forth in the following specification and shown in the accompanying drawings which form a part thereof.

The object of my invention is to provide a suitable construction of meter box especially adapted for water meters, whereby the meter may be attached or detached with respect to the water pipes and removed from the surface of the ground or sidewalk without removing the meter box itself and without the necessity of having the box large enough for a man to get down into the same for the purpose of connecting and disconnecting the meter. By my improvement the meter box need not have a cross section materially greater than the area occupied by the meter in plan, and the said meter may be placed in position and mechanically connected with the water pipes without the necessity of the workman actually handling the meter and the connections.

This invention is especially useful when the meter has to be replaced or removed for repairs and where a large cover to the meter box would be objectionable.

My invention consists of a meter box provided with an inlet and outlet relatively adjustable to and from each other, combined with means for imparting a relative adjustment of the inlet and outlet to or from each other and maintaining the adjustment, whereby the meter may be clamped between the said inlet and outlet.

My invention also consists of the above construction when provided with supporting bearings for the meter and suitable packing within the meter box between which the meter is adapted to be clamped.

My invention further consists of a meter box provided on one side near its bottom with a port, and on its other side with an adjustable tubular part between which and the port the meter is clamped so that the orifices or ports of the meter are in alinement with the port and tubular part of the meter box, combined with means for adjusting the tubular part in the direction of its length.

My invention also comprehends details of construction which, together with the features above specified, will be better understood by reference to the drawings, in which:

Figure 1 is a sectional elevation of a meter box showing the meter in position and embodying my invention; Fig. 2 is a sectional elevation of the adjustable tubular part of the meter box on a larger scale; Fig. 3 is a plan view of the same, and Fig. 4 is a cross sectional view of the same.

The meter box proper consists of a base 2 upon which is fitted a middle section 5, and these are combined with a telescopic section 6 which extends upward to the pavement or surface of the ground. The telescopic part 6 enables the box to be varied as to its total depth to suit the distance of the water pipes below the pavement. The extreme upper end of the part 6 is provided with a removable cover 7, said cover having an engaging hook 8 and an adjustable lock or latch 9 for holding it fixedly to the top of the box and yet permit its removal when it is desired to have access to the meter. The lower part 2 of the meter box is provided on the bottom with drainage apertures 10; and further, upon one side with a screw threaded port 3 and on the other side with a tubular guide bearing 4. The port 3 is provided with a recessed inner end 11 in which is located a packing washer 12 and immediately below the washer and upon the inside of the box is a supporting bearing 13.

Fitting into the tubular bearing 4 is a tubular part 14 which is screw-threaded on the end as at 26 for connection with the water pipe. This part 14 is also provided with a screw-thread 20 about its main portion. The inner end of the tubular part 14 is provided with a recess or socket 15 in which a packing washer 16 is placed, and the lower portion in front of the packing washer is formed into a supporting bearing 17. This tubular part 14 is prevented from rotating by means of the pin 18 which works in a hole 19 in the body of the box 2. Surrounding the screw-threaded tubular part 14 and engaging the threads 20 thereof, is a worm wheel 21, said worm wheel being held against movement in the direction of the length of the tubular part 14 by being located in a slot 22 in the base of the box. Meshing with the worm wheel 21 is a worm 23, the said worm being journaled in the box 2 and provided on its end with a polygonal head 24. A key 25, indicated in dotted lines in Fig. 1, may be inserted from above into the box and by engaging the head 24, the worm 23 may be rotated and thereby rotate the worm wheel 21 with the result that the tubular part 14 may be shifted or adjusted longitudinally.
27 represents an ordinary water meter and may be of any suitable construction. These meters are provided with inlets and outlets of which 28 is one and 29 the other. These parts 28 and 29 are placed in the supporting bearings 13 and 17 respectively and then, by turning the worm 23, the tubular part 14 may be adjusted toward the port 3 and thereby clamp the water ports of the meter between the packing washers 11 and 16. In this manner, the meter may be attached in position within the meter box without the necessity of employing rotating parts or the usual couplings. In the drawing, I have shown the ordinary screw-threads found upon the inlet and outlet ports of the meters, but these screw threads have no function to perform when such meter is employed in connection with my improvements.

Ordinarily, the iron water pipe may be screwed into the port 3 and in this way provide water to the meter. The adjustable tubular part 14 may have its threaded end 26 connected by a coupling with the lead pipe leading into the house and which will give ample elasticity to permit of the longitudinal adjustment of the tubular part 14 in clamping and unclamping the meter in position. The supporting bearings or sockets 13 and 17 are substantially the same and both act to support the meter as indicated in Fig. 1, preferably above the bottom of the box 2.

It will be understood from the above construction that the meter may be clamped in operative position without the necessity of the workman entering the box or reaching down to the inlet or outlet sides of the meter for making connections, as the connection may be accomplished by manipulations wholly from above the box. It is also evident that, while I have shown powerful means for securing the clamping adjustment of the tubular part 14, the relative adjustment of said part with respect to the port 3 may be secured by any other suitable mechanical means which may be operated from above, and hence I do not restrict myself to the particular means shown.

While I prefer that the port 3 shall be the inlet port of the meter box, it is evident that these may be reversed as the particular direction of the flow of the water is immaterial as the object to be accomplished is the same irrespective of which direction the water flows.

Broadly considered, my invention comprehends tubular water passages arranged in the bottom of a meter box and terminating in clamping ends, when combined with means for adjusting these clamping ends relatively to or from each other for clamping or releasing a meter between them, and while I prefer the construction shown, for accomplishing this purpose, I do not limit myself to the details thereof as these may be modified without departing from the spirit of the invention.

Having now described my invention what I claim as new and desire to secure by Letters Patent, is:

1. In a meter box, a lower portion having at one side a fixed port for the passage of water, combined with a longitudinally adjustable tubular part extending through the opposite side of the meter box and constituting the other water port thereof, said tubular part being screw threaded at its outer end, and means to adjust the tubular part bodily toward or from the fixed port whereby a meter may be clamped between the fixed port and the longitudinally adjustable part.

2. In a meter box, a box shaped portion having at one side a fixed port and at the other side a guide passage, combined with packing about the fixed port on the inside, a tubular portion guided in the guide passage in the box and having at its outer end screw threads, packing arranged upon its inner end, a meter having its integral ports at opposite sides directly clamped between the packing of the fixed port and the adjustable tubular portion, means carried by the box and surrounding the adjustable tubular portion and mechanically connected with it for adjusting said tubular portion toward or from the fixed port.

3. In a meter box, a lower portion having at one side a port for the passage of water and provided with a supporting bearing at a lower elevation than and to one side of the port for the meter on the inside of the box, combined with a longitudinally adjustable tubular part at the opposite side of the meter box and constituting the other port of the meter box and also provided on its inner end with a supporting bearing at a lower elevation and independent of the port for the meter, and means to adjust the tubular part toward or from the first mentioned water port whereby a meter may be clamped between the water port and the longitudinal adjustable part while being supported upon the bearings.

4. In a meter box, a lower portion having at one side a port for the passage of water, combined with a longitudinally adjustable tubular part at the opposite side of and extending through the meter box and threaded to constitute the other water port thereof, and means consisting of gearing adapted to be rotated from the upper part of the meter box to adjust the tubular part bodily toward or from the first mentioned water port whereby a meter may be clamped between the water port and the longitudinal adjustable part.

5. In a meter box, a lower portion having at one side a port for the passage of water, combined with a longitudinally adjustable tubular part at the opposite side of the meter box and constituting the other water port thereof, and means to adjust the tubular part toward or from the first mentioned water port consisting of gearing comprising a worm wheel carried by the meter box and having a screw-threaded connection with the longitudinally adjustable part and a worm carried by the meter box engaging the worm wheel for rotating it, whereby a meter may be clamped between the water port and the longitudinal adjustable part.

6. In a meter box, the combination of a box portion having inlet and outlet port portions for the water between which a meter may be clamped said portions being adjustable relatively toward or from each other and one of them adjustable bodily through the side of the box, with soft packing gaskets in said inlet and outlet port portions and facing each other, means for imparting a longitudinal adjustment to the port portion extending through the side of the box, and a meter having fixed ports directly clamped between the packing gaskets of the inlet and outlet portions.

7. In a meter box, the combination of a box portion having inlet and outlet port portions for the water between which a meter may be clamped said portions being adjustable relatively toward or from each other and one of them adjustable bodily through the side of the box, with soft packing gaskets in said inlet and outlet port portions and facing each other, means for imparting longitudinal adjustment to the port portion extending through the side of the box consisting of a gear wheel screwed upon the adjustable port portion, means for holding the gear against displacement in the box, and means engaging the said gear for rotating it.

8. A meter box having a fixed port, a tubular portion constituting the other port extending through the opposite wall of the box and adjustable lengthwise through the said wall, combined with a meter having its ports arranged between the fixed port of the box and the inner end of the adjustable tubular portion, and means for adjusting said tubular portion through the side of the box to directly clamp the meter in position between the fixed port and the tubular portion.

9. A meter box having a fixed port, a tubular portion constituting the other port extending through the opposite wall of the box and adjustable lengthwise through the said wall, combined with a meter having its ports arranged between the fixed port of the box and the inner end of the adjustable tubular portion, means for adjusting said tubular portion through the side of the box to directly clamp the meter in position between the fixed port and the tubular portion, and supports for the meter arranged directly under its ports for sustaining its weight while exposing the junction of the said ports with the fixed port and the adjustable tubular portion of the box aforesaid.

10. In a meter box, a lower portion having at one side a fixed port for the passage of water, combined with a longitudinally adjustable tubular part extending through the opposite side of the meter box and constituting the other water port thereof, annular packing around the fixed water port on the inside of the box, annular packing on the inner end of the longitudinal adjustable part, a meter having inlet and outlet portions directly clamped between the packing of the inlet and outlet ports, and means to bodily adjust the tubular part toward or from the fixed water port whereby a meter may be directly clamped between them.

11. A meter box having a fixed port at one side, combined with an adjustable tubular part constituting the other port and guided through the opposite wall of the box, a meter clamped between the fixed port and the inner end of the adjustable tubular part, means to prevent the adjustable tubular part from rotating while permitting longitudinal adjustment, a worm wheel surrounding the adjustable tubular part and connected therewith by a screw threaded joint, and a worm arranged upon an upright axis and engaging the worm wheel for rotating it.

12. A meter box having a fixed port at one side having a lower socket bearing, combined with an adjustable tubular part constituting the other port and guided through the opposite wall of the box and provided upon its inner end with a lower socket bearing, a meter clamped between the fixed port and the inner end of the adjustable tubular part and having its port portions resting in the socket bearings of the fixed port and adjustable tubular part, means to prevent the adjustable tubular part from rotating while permitting longitudinal adjustment, a worm wheel surrounding the adjustable tubular part and connected therewith by a screw threaded joint, and a worm arranged upon an upright axis and engaging the worm wheel for rotating it.

In testimony of which invention, I hereunto set my hand.

HERBERT M. LOFTON.

Witnesses:
F. E. MURRAY,
V. J. DODGE.